Figure 1:
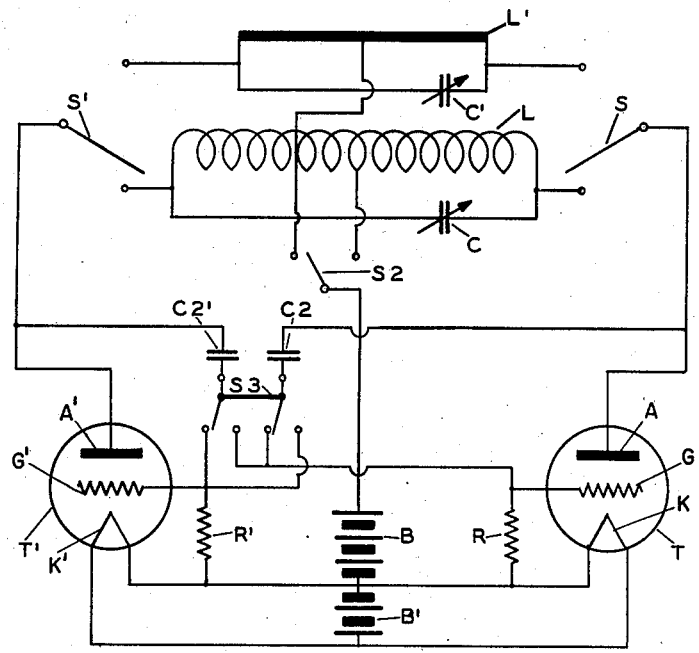

Dec. 11, 1951  S. R. MONTCALM  2,578,575
ELECTRICAL ALTERNATING CURRENT GENERATION
Original Filed June 1, 1944  4 Sheets-Sheet 1

SURRIUS RECTOR MONTCALM
INVENTOR

BY Darby & Darby
ATTORNEYS

Dec. 11, 1951  S. R. MONTCALM  2,578,575
ELECTRICAL ALTERNATING CURRENT GENERATION
Original Filed June 1, 1944  4 Sheets-Sheet 2

SURRIUS RECTOR MONTCALM
INVENTOR

BY Darby & Darby
ATTORNEYS

Dec. 11, 1951     S. R. MONTCALM     2,578,575
ELECTRICAL ALTERNATING CURRENT GENERATION
Original Filed June 1, 1944     4 Sheets-Sheet 3
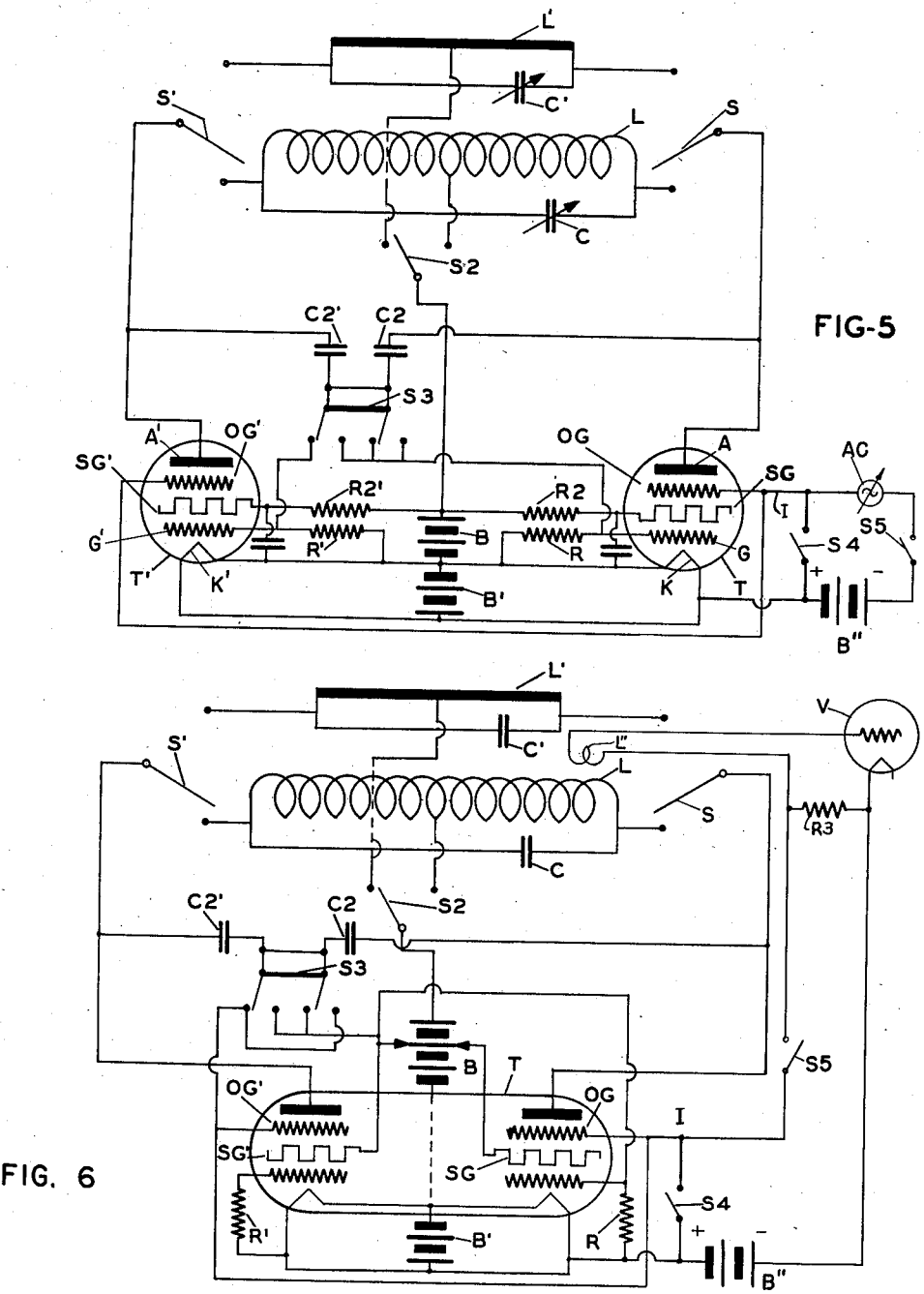
SURRIUS RECTOR MONTCALM
INVENTOR
BY Darby & Darby
ATTORNEYS Dec. 11, 1951 S. R. MONTCALM 2,578,575
ELECTRICAL ALTERNATING CURRENT GENERATION
Original Filed June 1, 1944 4 Sheets-Sheet 4

SURRIUS RECTOR MONTCALM
INVENTOR

BY Darby & Darby
ATTORNEYS

Patented Dec. 11, 1951

2,578,575

UNITED STATES PATENT OFFICE 2,578,575

ELECTRICAL ALTERNATING CURRENT GENERATION

Surrius Rector Montcalm, Boonton, N. J., assignor to Ferris Instrument Laboratories, Boonton, N. J., a corporation of New Jersey Original application June 1, 1944, Serial No. 538,221. Divided and this application October 11, 1949, Serial No. 120,671

24 Claims. (Cl. 250—36)

My present invention broadly relates to the generation of electrical alternating currents, and is a division of my application Serial No. 538,221, filed June 1, 1944, now U. S. Patent No. 2,533,032, issued December 5, 1950, which itself is a continuation-in-part of an application I filed in the United States Patent Office on April 1, 1942, given Serial No. 437,117, now abandoned.

For the generation of the electrical alternating currents involved, my present invention permits the use of certain forms of standard thermionic tubes associated with special circuits and elements thereof so selected and arranged that the generation of electrical alternating currents, ranging in frequencies of alternation from audible frequencies without interruption into ultra-high frequencies of hundreds of megacycles, is accomplished simply, without changing the tubes in use, by easily made changes in the special circuits and elements involved.

I am acutely aware of the fact that standard thermionic tubes of certain forms associated with certain circuits and elements thereof have long been used for the generation of electrical alternating currents, but I have also found that the prior practices for such generation become highly inefficient, unstable and unreliable as increased frequency of operation is pursued, to become totally inoperative for generation as operation at still higher frequencies is pursued, with the border line between generation and non-generation depending upon disturbingly elusive and difficult to analyze and manage variations in the characteristics of the thermionic tubes, circuits and circuit elements involved.

As an example of a particular object of my present invention, the arrival of the recent war soon gave birth to pressing needs for so-called standard signal generators exceeding by far in ranges of frequencies of operation everything in this respect contemplated in the signal generator Patents Nos. 1,793,601; 1,877,287; 2,037,160; 2,131,101 and 2,265,637 issued to Malcolm Ferris at various times, even though the last one of the said patents clearly contemplated electrical alternating currents generated at frequencies of the order of 150 megacycles which were even then dormant from the viewpoint of commercial operations; and thus gave rise to the particular object of evolving out of what was then available for the existing standard signal generators, commercially acceptable means for generating electrical alternating currents at frequencies both near and far along on both sides of 150 megacycles, with the time element the most critical of all of the elements necessarily involved. That this particular and pressing object has been successfully met and mastered by my present invention is attested to by the fact that it has been successfully worked into a standard signal generator having a successful coverage of from 20 megacycles to 250 megacycles without any change whatever being required by the use of any duplex thermionic tube, or equivalent pair of thermionic tubes, selected for the particular installation.

From the circumstances above set forth, it becomes clearly apparent that the principal object of my present invention is to avoid departing from thermionic tubes having standardized construction in order to effectively generate with the aid thereof electrical alternating currents stable and otherwise dependable in character at and both above and below a region of frequencies in which the generation activities involved tend to become unstable and/or unreliable in the absence of the corrective measure for which my present invention provides.

Figure 2:
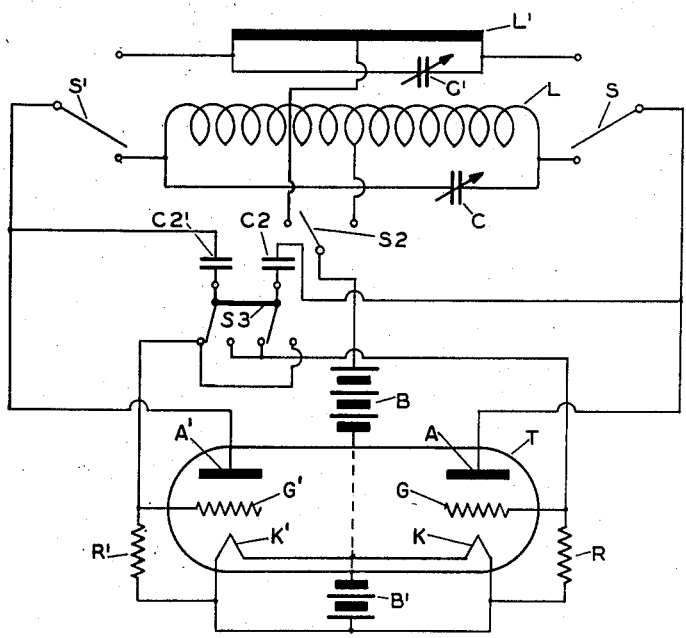
Figure 3:
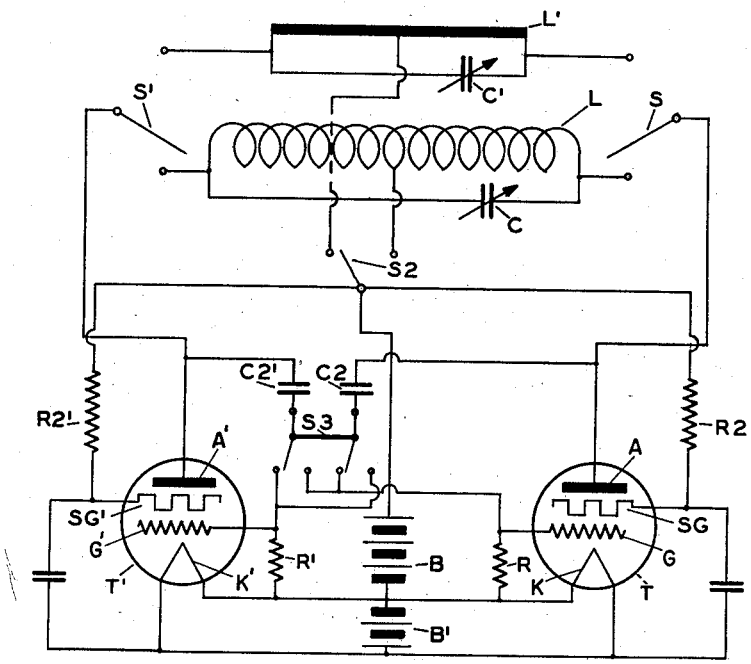
Figure 4:
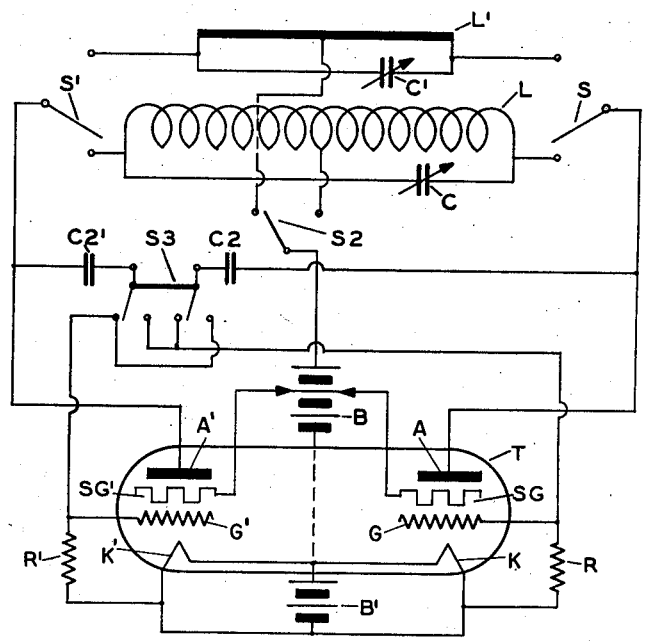
Figure 7:
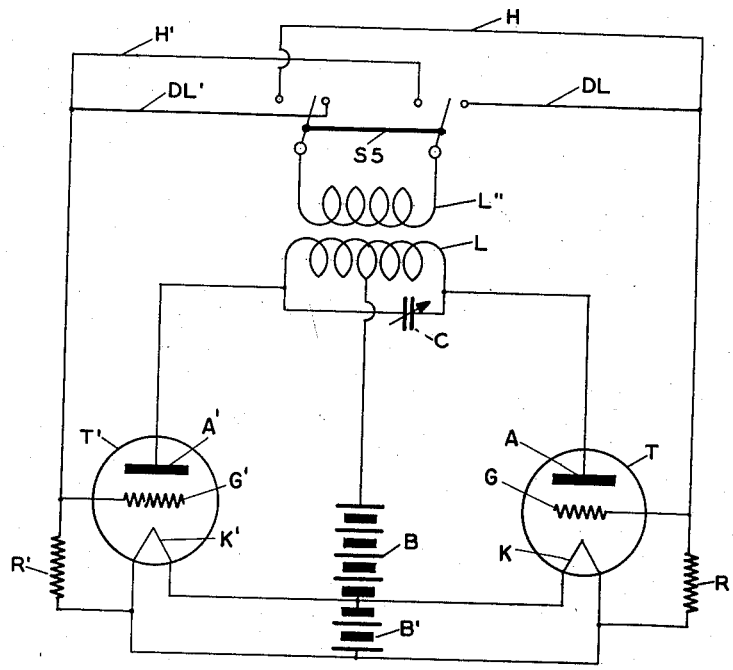
Figure 8:
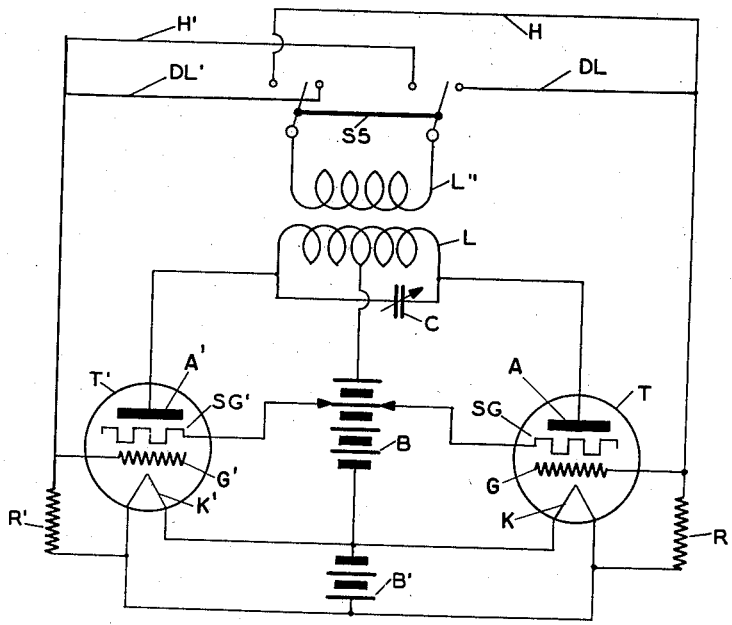

As aids to fully describing my present invention, I rely on the figures of the accompanying drawing, first briefly identifying them as follows:

Figures 1 and 2 diagrammatically represent generic embodiments of my present invention in which the embodiment of Figure 2 differs from that of Figure 1 only in showing the substitution of a duplex type of thermionic tube in lieu of two separate thermionic tubes;

Figures 3 and 4 diagrammatically represent the embodiments of Figures 1 and 2, respectively, with the exception that they show an additional electrode in the thermionic tubes involved;

Figures 5 and 6 diagrammatically represent the embodiments of Figures 1 and 2, respectively, with the exceptions that they show two additional electrodes in the thermionic tubes involved plus leads originating externally of the tubes involved to each one of the second additional electrodes, in which leads special devices are included as hereinafter described;

Figure 7 diagrammatically represents the embodiment of Figure 1 with the exception of circuit modifications;

Figure 8 diagrammatically represents the embodiment of Figure 3 with the exception of circuit modifications.

Like reference symbols of the respective figures of the drawings represent like or closely related parts therein.

Referring to Figure 1, it shows a pair of thermionic tubes T and T', each containing a respective conventionally indicated cathode K and K' heated for electron emission by battery B', a respective anode A and A' maintained at a positive potential by battery B, and a grid electrode G and G' interposed therebetween, each grid G and G' being maintained at a negative potential by the well known action of the respective grid-leak resistances R and R'. The two active electron paths thus formed are, in keeping with the requirements of my present invention, chosen to be and to remain as near as possible physically and functionally identical.

Each anode A and A' of the respective tubes T and T' is shown to be conductively connected to a separate respective switching arrangement S and S', respectively; and, as indicated, connection of each respective anode A and A' with a respective extremity of a resonant circuit formed by an inductance L and a variable capacitance C in parallel therewith is obtainable through the lower positioning of the movable arms of the respective switching arrangements with respect to the fixed contact points thereof. This action, as further indicated, will result in anodes A and A' being brought into conductive connection with the positive terminal of the battery B through a mid point of inductance L by means of a switch S2, if switch S2 is in contact or is placed in contact with its indicated right hand contact point.

With the switches S' and S in their upper positions, a different resonant circuit formed by an inductance L' and a variable capacitance C' is connected between anodes A and A', inductance L' being preferably a straight bar for minimum inductance value, to obtain highest resonant frequency. With switch S2 in the left position, battery B is connected to anodes A and A' through the center tap of inductance L'.

With the embodiment of Figure 1 connected up and energized to the foregoing extent, with the exception of the very small amounts of capacitances existing between the respective anodes and grids of the respective tubes, there is no effective feed-back coupling between the respective cathode-grid and cathode-anode circuits, to say nothing of any properly phased feed-back coupling, without which it is elementary that such arrangement is totally lacking in ability to act as a generator of electrical alternating currents irrespective of the electrical natural period of the resonant circuit LC, and that what little electrical couplings do exist due to the said interelectrodal capacitances, acts in opposing phases to those actually required, and, therefore, automatically oppose and make impossible the attainment of the specific feed-back coupling functioning on which the generation of electrical alternating currents absolutely depends.

Quite some time ago it was discovered that if a suitable amount of lumped capacitance is inserted between the anode of each of the tubes and the grid of the respective companion tube sufficient to overcome the respective opposing actions of the inherent interelectrodal capacitances, satisfactory generation of electrical alternating currents at all of the frequencies occupying the attention of the art was attained, the reason therefor apparently being that in addition to being able to attain thereby much higher degrees of overall electrical coupling, the reversed feed-backs brought about cancelled out the opposing feed-backs, with a resultant of overall feed-backs of properly timed phases. In other words, it seems that when generation of electrical alternating currents at the frequency fixed by the electrical natural period of the circuit LC actually occurs, the reason therefor is that the potential at any point of the inductance L other than the actual electrical mid point alternately swings positive and negative to alternately swing one anode more positive while swinging the other anode less positive than fixed by the direct positive potential of the battery B, with the result that a capacitance connected between the anode of tube T and the grid of tube T', for example, will consequently act, when the anode of tube T swings to more positive, to cause the grid of tube T' to swing less negative, and thereby cause the current flow through the anode of tube T' and the circuit LC to increase, and vice versa in the respective tubes as actual generation goes on; from which it would ordinarily appear to be obvious that if this swinging should be reversed, actual generation must cease.

Through the indicated lumped capacitances C2 and C2' and the indicated switching arrangement S3, the above described swinging of potential actions, or the reverse of them, can be selectively brought to bear by obvious proper use of the said switching arrangement, and by reverse it is meant that the artificial capacitance is connected from anode to grid of the same tube in the cases of both tubes. Thus, with switch S3 in the left position, anode A is coupled to its corresponding grid G through capacitance C2, and similarly anode A' is coupled to grid G' through capacitance C2'. In the right position of switch S3, these connections are reversed, and each anode A and A' is capacitively coupled to the grid G' and G, respectively, of the other tube.

With this addition to the embodiment of Figure 1, but with proper changes in the inductance and capacitance values in the case of circuit LC, I have found that with the same pair of tubes in action, dependable generation of electrical alternating currents ranging from audible frequencies to ultra-high frequencies of the order of 250 megacycles is decidedly easy to obtain and maintain because there appears to be a substantial overlapping in the frequency region wherein dependable generation can be had with the switching arrangement S3 in either one of its two positions, which continues to be obtainable and maintainable far along on the ultra-high frequency side of this region by adhering to the "reverse" form of operation. In other words, I have found that before the ordinary form of operation becomes too unstable to be of practical value as increase of frequency of operation is pursued, the "reverse" form of operation has become adequately stable to satisfactorily take over.

From a strict technological point of view, I am not certain as to just what is involved in the way of relative actions that are responsible for the phenomena behind the success of operation at ultra-high frequencies found in using the "reverse" form of operation; however, it seems that to a large extent they must be based on time factors. Irrespective of the laws of nature involved, the fact that such enormous ranges of operations can be covered with only a single simple circuit fixing the frequencies at which standard thermionic tubes generate electrical alternating currents without interfering action on the parts of the two grid-cathode circuits is indeed surprising from the point of view of results previously sought and obtained.

Figure 1 further brings out that through simple switching arrangements (S and S') a circuit having a rod or bar form of inductance L' can readily replace circuit LC having a coil form of inductance L, which is in accordance with practical considerations because as the generation of ultra-high frequency electrical alternating currents of increasing frequency is pursued, the coil type of inductance becomes more and more undesirable and even has to be abandoned and replaced by the rod or bar form of inductance which takes on very small physical proportions when it comes to dealing with operations at 200 megacycles and above.

As an example of what this practice can amount to, in covering operations from 20 megacycles to 250 megacycles, with margins at both ends, I have lodged six separate variable LC circuits with overlapping electrical natural periods longitudinally on the inner wall of a rotatable cylinder with contact terminals so laid out that on rotation of the said cylinder any one of the six units could become a part of the embodiment of Figure 1, and at the same time automatically make the respective connections disclosed in connection with switching arrangements S2 and S3, all from panel installed control means. Thus, an operator of such a generator has under his immediate command the generation of an electrical alternating current of any frequency in a range of nothing less than 20 megacycles to 250 megacycles.

Figure 2, as before disclosed, represents an embodiment of my present invention substantially the equivalent of the embodiment of Figure 1 with the exception that a standard duplex type of thermionic tube takes the place of the two thermionic tubes of Figure 1. This change provides for using but one tube socket in place of two in addition to resulting in a saving of space which becomes extremely important when such a generator must be lodged in a housing otherwise crowded with many other things such as happens in the cases of designing and building the various current models of standard signal generators.

Figure 3, as before disclosed, represents an embodiment of my present invention substantially the equivalent of the embodiment of Figure 1 with the exception that standard 4-electrode thermionic tubes take the places of the 3-electrode tubes of Figure 1. In this case, the fourth or additional electrode SG or SG', is of the so-called screen grid type, and, being interposed between the anode and grid and maintained at a positive potential less than the positive potential of the anode by being connected to battery B through respective voltage dropping resistors R2 and R2', it serves to substantially eliminate the inherent capacitance between anode and grid existing in the case of the 3-electrode tubes of Figure 1, which makes the necessary feed-back action substantially independent of whatever defects that might occur in standard tube manufacture as well as changes in placement of the electrodes that are likely to happen under the normal high temperature conditions that continue with abatement during the usual long life built into standard 3-electrode tubes. In other words, in the case of the particular embodiment of Figure 3, no occasion is likely to arise for later adjusting the values of the artificial capacitances C2 and C2' to make up for changes in the paralleling inherent interelectrodal capacitances of the tubes in the Figure 1 embodiment.

A further advantage derivable from the screen-grid tube embodiment of Figure 3 is that it can better be depended upon for maintained stability where a higher power output is sought.

The advantage of the duplex type of tube embodiment of Figure 4 over the Figure 3 embodiment, the embodiments being otherwise substantially equivalent, is the same as that set forth with respect to Figure 2 over Figure 1.

Figure 5, as before disclosed, differs from the embodiment of Figure 1 by reason of resorting to standard thermionic tubes having added thereto two electrodes, namely, screen grids SG and SG', which are subject to the same comments as those set forth in connection with the SG and SG' electrodes of the tubes involved in the description of Figure 3, plus the indicated control type of grids OG and OG' shown located adjacent to the respective anodes. These grids are indicated as having leads thereto which conductively come together outside of their respective tubes to form a single lead or terminal I having connections to switches S4 and S5 as shown.

By closing switch S4 while keeping switch S5 open, the tubes become equivalents of so-called "power amplifier pentode" tubes such as the RCA 6F6 sold by the RCA Manufacturing Co., Inc., because it results in maintaining the potential of the grids OG and OG' at the same potential as their corresponding cathodes K and K', which type of tube, because of its higher power characteristics, makes it possible to generate higher powered electrical alternating currents with standard tubes properly embodied in my present invention.

In many cases, such as in radio telephony and television, the carrier electrical alternating currents must be modulated to produce proper signal bearing currents, which modulation can be done with unusual efficiency by applying the particular signal potentials as from source AC, to terminal I while switch S4 remains open, under which modulation conditions it would be desirable to maintain the respective grids OG and OG' so sufficiently negative as by a battery B'' that they would not draw grid current on the positive half cycles of the generated and modulated electrical alternating currents to thereby preserve the fidelity of operation.

In other cases, such as in standard signal generators, it often becomes desirable to control either automatically or at will the output volume of the electrical alternating currents, which, in the case of the Figure 5 embodiment can be done by controlling the degree of negative potential impressed on the outer grids OG and OG' by either applying a manually controlled source of negative potential to the input terminal I or doing the same through developing the variable negative potential involved by rectifying a portion of the generated output, whereby, as the volume of generation increases the negative potential derived from rectification will automatically increase to thereby lower the volume of generation, and vice versa in case the volume of generation tends to fall off, as shown more in detail in Figure 6.

Should it be desired to obtain ultra-high frequency electrical alternating currents of frequencies higher than anything that can be obtained by the "reverse" method of my present invention, it can be accomplished by applying to terminal I the alternating potentials of an independently generated electrical alternating current as from source A. C. For example, if the generation of the embodiment of Figure 5 is limited to electrical alternating currents of a peak frequency of 300 megacycles, and while so generating, terminal I is subjected to alternating potentials of a frequency of 200 megacycles, it is obvious that with a selecting circuit having an electrical natural period of 500 megacycles coupled to circuit LC or L'C' there will be selected electrical alternating currents equaling the sum of 300 and 200 megacycles in frequency, or 500 megacycles in frequency.

Another way of making use of the embodiment of Figure 5 is that even if it is confined to the "reverse" method of operation, and it is desired to cover frequencies so low that the "reverse" method fails to produce them, all of the production at the desired lower frequencies can be had, for example, by holding the electrical natural period of circuit L' C' to 200 megacycles while applying alternating potentials of any frequency desired to terminal I, and selecting from circuit L' C' electrical alternating currents of a frequency equal to the difference between 200 megacycles and the X megacycles applied, which, for example, if X equals 180 megacycles, will necessarily be 20 megacycle electrical alternating current, and so on to where the frequency becomes high enough for the "reverse" method of generation alone to take over. It should be noted that if it is compulsory that the lowest frequency be of the order of 20 megacycles, and it is not feasible to supply to terminal I alternating potentials of 180 megacycles, one readily available answer would be the setting of the circuit L' C' at a more logical lower electrical natural period as low as the difference involved seems to so require. Thus, from the facts set forth, it follows that I have found more than one way for making available electrical alternating currents ranging in frequency from audibility to ultra-high frequencies, measured in hundreds of megacycles, without shifting tubes.

Figure 6, with the exception of indicating that it makes possible certain savings in relying upon a duplex type of tube and showing means for automatic volume control, is, in its embodiment, otherwise substantially the equivalent of the embodiment of Figure 5, and, therefore fully fits into the description of Figure 5 as to accomplishments. For automatic volume control, a coil L'' coupled to inductance L picks up a signal which is rectified by a conventional vacuum tube V or other rectifier to develop unidirectional potential differences across its load resistor R3 which are added to that of bias battery B''. If the amplitude of excitation of inductance L increases, the resultant increase in negative potential applied to grids OG and OG' will automatically act to restore the amplitude to the desired value, as is well known in the art.

Figure 7, as before disclosed, with the exception of certain modifications in the circuits and their elements involved, is, in its embodiment, substantially the equivalent of the embodiment of Figure 1. It teaches that if it is not feasible for design or other reasons to feed the control grids G and G' the properly timed potentials to cause and sustain the generation of electrical alternating currents through capacitances arranged in accordance with the teaching of Figure 1, there is at least one alternative in which no artificial anode-to-grid capacitances are used. Instead inductance L'' is coupled to the inductance L of the frequency control circuit LC, and is terminated in a double throw switch S5. With this embodiment, I have found that when switch S5 connects with the contact points terminating the anode leads H and H', generation of electrical alternating currents of a wide range of frequencies is obtainable; and that when switch S5 connects with the contact points terminating the anode leads shown by the lines DL and DL', with some overlapping, generation of electrical alternating currents of another wide range of frequencies becomes obtainable. I have also found that, with other things remaining unchanged, if the axis of the coil L'' is reversed in direction, the frequencies generated change range; that is, in one position of coil L'' the range of frequencies first included is of the order of 100 megacycles and far below, while on the said reversal of coil L'' this range of frequency generation becomes of the order of 100 megacycles and far above, and vice versa. Once it is known what to expect, determination of which way to set up coil L'' to obtain the proper results is a very simple matter.

Thus, the results obtained after reversal of the axis of coil L'' compared to the results obtained before the said reversal, coupled with the results obtainable out of all of the other embodiments of my present invention, clearly prove that, irrespective of modified circuit details, unadulterated standard thermionic tubes having the proper numbers and arrangements of electrodes, properly handled, can be depended upon in connection with designing generators of electrical alternating currents meeting all of the frequency demands reasonably foreseeable at the present time by those interested in the particular art.

Figure 8, as before disclosed, with the exception of certain modifications in the circuits and their elements involved substantially the same as those treated in connection with Figure 7, is, in its embodiment, substantially the equivalent of Figure 3. Including as it does in the thermionic tube screen grid SG and SG' which, as in the case of Figure 3, act to substantially cancel out the anode-to-grid capacitance effects inherent in the tubes of Figure 7, the fact that it works fully as well as the embodiment of Figure 7 proves beyond all doubt that the latter does not necessarily depend at all upon the inherent anode-to-grid capacitance that exists in each of its respective tubes for its satisfactory operation as a generator of electrical alternating currents described above.

Obviously, the coupling of coil L'' to inductance L in Figures 7 and 8 automatically makes its reactions to the current flows involved an integral part of the reactions of circuit LC in determining the frequency control of the electrical alternating currents involved, which reactions will under all conditions be necessarily small due to the very high impedance of the grids across which it is connected. Also, in all of the embodiments with respect to any load circuit associated with circuit LC, in the cases of the reactions involved they automatically become an integral part of the reactions of the circuit LC in determining the frequency control of the electrical alternating currents involved, which reactions will of course depend upon the respective loads taken by the respective load circuits.

It will be understood that the coupling from the circuit LC to the control grids G and G' by means of coil L'' and switch S5 as shown in Figures 7 and 8 can also be used in Figure 5 in substitution for the couplings to grids G and G' by way of condensers C2 and C2'' and switch S3 of Figure 5.

Since duplex tubes have been successfully used by me with the modifications specifically embodied in Figures 7 and 8, my failure to show the same in the drawings is not intended as a denial of their workability in connection with my present invention; and the same is true with respect to not showing with them a plurality of frequency control circuits including either or both coil and rod types of inductance. The same remarks also apply to my failure to apply the modifications involved to the 5-electrode tubes of Figures 5 and 6.

While I have described my present invention in certain confined respects, it is apparent that modifications may be made, and that no limitations are intended other than those imposed by the scope of the appended claims.

What is claimed is:

1. In a system for generating an electrical alternating current of an ultra high frequency: the combination of two substantially identical electron paths each having at least an electron source in spaced relation to an effective electron attracting positive potential anode and a negative potential control grid interposed therebetween in normal spaced relation thereto; a paralleled inductance and capacitance circuit having an electrical natural period corresponding to the ultra high frequency desired and having oppositely phased terminations coupled to the respective ones of the said anodes, which said circuit with its associated reactions alone determines the frequency of generation; and an inductance coupled to the first mentioned inductance having oppositely phased terminations coupled to the respective ones of said control grids so chosen as to the respective ones of said grids that the said system will generate electrical alternating current only when the electrical natural period of said circuit corresponds to an ultra high frequency high enough to cause said system to overcome its inherent opposition to generating electrical alternating currents of lower frequency.

2. The system of claim 1 in which the electrical natural period of the circuit comprising paralleled inductance and capacitance is variable over a substantial range of the ultra high frequencies in which it will generate electrical alternating currents.

3. The system of claim 1 in which, by suitable switching mechanism, the phases of the potentials distributed to the respective ones of the said control grids can be reversed to make it possible for the system to include generation of electrical alternating current of lower frequencies provided the electrical natural periods of the circuit are accordingly changed.

4. The system of claim 1 in which coil form inductance is replaced by rod form inductance.

5. The system of claim 1 in which the two electron paths are consolidated in a single envelope.

6. The system of claim 1 in which a positive potential screening electrode is interposed between the anode and the control grid.

7. In a thermionic tube and circuit system for generating electrical alternating currents ranging in frequency from audible to ultra high or substantial fractions thereof with the same electron tube system: the combination of two substantially identical thermionic tube electron paths each having at least an electron source in spaced relation to an effective electron attracting positive potential anode and a negative potential control grid interposed therebetween in normal spaced relations thereto; a set of variable-in-electrical-natural-periods paralleled inductance and capacitance circuits whose total natural periods summed up cover the entire range of frequencies desired, each circuit having oppositely phased terminals coupled to the respective anodes; and an inductance positioned to be electrically coupled to the inductance of any one of the said circuits when in use having oppositely phased terminals coupled to a switch mechanism having independent connections to the respective control grids by the functioning of which the phases of impressed alternating potentials on said control grids can be reversed; said circuits with their associated reactions alone respectively determining the frequencies of generation.

8. The system of claim 7 in which a positive potential screening grid electrode is interposed between the anode and control grid.

9. The system of claim 7 in which a positive potential screening electrode and a grid having a potential equaling the potential of the electron source are interposed between the negative potential control grid and the anode in the order named.

10. In a system for generating and modulating an electrical alternating current: the combination of two substantially identical electron paths each having an electron source in spaced relation to an effective electron attracting positive potential anode plus two negative potential control grids interposed therebetween and a positive potential screening electrode interposed between said control grids; a paralleled inductance and capacitance circuit having oppositely phased terminations coupled to the respective ones of said anodes; an inductance electrically coupled to the first mentioned inductance having oppositely phased terminations coupled to the respective ones of the control grids adjacent to their respective ones of said electron sources so chosen as to the respective ones of said grids that said system will generate an electrical alternating current of a frequency corresponding to the electrical natural period of said circuit; which said circuit with its associated reactions alone determines the frequency of generation; and a source of modulating current plus connections from the same to the respective control grids adjacent to the respective anodes.

11. In a system for generating and modulating an electrical alternating current of ultra high frequency: the combination of two substantially identical electron paths each having an electron source in spaced relation to an effective electron attracting positive potential anode plus two negative potential control grids interposed therebetween and a positive potential screening electrode interposed between said control grids; a paralleled inductance and capacitance circuit having oppositely phased terminations coupled to the respective ones of said anodes; an inductance electrically coupled to the first mentioned inductance having oppositely phased terminations coupled to the respective ones of said control grids adjacent to the respective ones of their electron sources so chosen as to the respective ones of said grids that said system will generate electrical alternating current if the electrical natural period of the said circuit corresponds to an ultra high frequency high enough to cause said system to overcome its inherent opposition to generating electrical alternating currents of lower frequencies, which said circuit with its associated reactions alone determines the frequency of generation; and a source of modulating current plus connections from the same to the respective control grids adjacent to the respective anodes.

12. In a system for generating and volume controlling an electrical alternating current: the combination of two substantially identical electron paths each having an electron source in spaced relation to an effective electron attracting positive potential anode plus two negative potential control grids interposed therebetween and a positive potential screening electrode interposed between said control grids; a paralleled inductance and capacitance circuit having oppositely phased terminations coupled to the respective ones of said anodes; an inductance electrically coupled to the first mentioned inductance having oppositely phased terminations coupled to the respective ones of said control grids adjacent to their respective ones of said electron sources so chosen as to the respective ones of said grids that said system will generate an electrical alternating current of a frequency corresponding to the electrical natural period of said circuit, which said circuit with its associated reactions alone determines the frequency of generation; and a source of volume controlling current plus connections from the same to the respective grids adjacent to the respective anodes.

13. In a system for generating and volume controlling an electrical alternating current of an ultra high frequency: the combination of two substantially identical electron paths each having an electron source in spaced relation to an effective electron attracting positive potential anode plus two negative potential control grids interposed therebetween and a positive potential screening electrode interposed between said control grids; a paralleled inductance and capacitance circuit having oppositely phased terminations coupled to the respective ones of said anodes; an inductance electrically coupled to the first mentioned inductance having oppositely phased terminations coupled to the respective ones of said control grids adjacent to the respective ones of their electron sources so chosen as to the respective ones of said grids that said system will generate electrical alternating current only if the electrical natural period of the said circuit corresponds to an ultra high frequency high enough to cause said system to overcome its inherent opposition to generating electrical alternating currents of lower frequencies, which said circuit with its associated reactions alone determines the frequency of generation; and a source of volume controlling current plus connections from the same to the respective grids adjacent to the respective anodes.

14. In a system for generating electrical alternating currents having two electron paths and associated circuits; which system is made capable of generating such currents at ultra high frequencies solely by a novel arrangement applied to said circuits: the combination of two substantially identical electron paths each having at least an electron source in normal spaced relation to an effective electron attracting positive potential anode and a negative potential control grid interposed therebetween in normal spaced relations thereto; a terminated connection to each of said anodes; a paralleled inductance and capacitance circuit having an electrical natural period corresponding to the ultra high frequency desired and oppositely phased terminations coupled to said anode terminations, which said natural period substantially alone determines the frequency of generation; and an inductance coupled to said first named inductance having oppositely phased terminations coupled to respective ones of said control grids so chosen as to opposite phases that said system will generate an electrical alternating current of the ultra high frequency desired if the frequency to which the electrical natural period of said circuit corresponds is the ultra high frequency desired.

15. The system of claim 14, in which the two electron paths are consolidated in a single envelope.

16. The system of claim 14, in which a positive potential screening electrode is interposed between the control grid and the anode in each electron path.

17. The system of claim 14, in which rod form of inductance is employable.

18. The system of claim 14, in which the circuit employing paralleled inductance and capacitance has said capacitance variable enough to make said system's generation of electrical alternating currents variable over a substantial range of ultra high frequencies.

19. The system of claim 14, in which a suitable-for-the-purpose switching mechanism associated with the oppositely phased terminations of the second-named inductance provides for switching said terminations coupled to the respective ones of the control grids to thereby reverse the phases of the alternating potentials impressed thereon and consequently adapt said system for generating electrical alternating current of lower-than-otherwise frequency if the electrical natural period of the circuit employing paralleled inductance and capacitance is changed to correspond to the lower frequency involved.

20. The system of claim 14, in which a positive potential screening electrode and a grid having a potential substantially equaling the potential of the electron source are interposed in the order named between the negative potential control grid and the anode in each electron path.

21. The system of claim 14, in which a positive potential screening electrode and a negative potential control grid are interposed in the order named between the control grid and anode in each electron path and a source of electrical alternating current is connected between said negative potential control grids nearer to said anodes and the electron sources of said electron paths.

22. The system of claim 14, in which a positive potential screening electrode and a negative potential control grid are interposed in the order named between the control grid and anode in each electron path and a source of electrical alternating current is connected between said negative potential control grids nearer said anodes and the electron sources of said electron paths, the negative potential of said control grids nearer to said anodes being substantially enough to exceed the potentials of the positive half cycles of said alternating current.

23. The system of claim 14, in which a positive potential screening electrode and a negative potential control grid are interposed in the order named between the control grid and anode in each electron path and a source of unidirectional volume controlling potential is connected between said negative potential control grids nearer to said anodes and the electron sources of said electron paths.

24. A wide-range oscillator system comprising means providing a pair of independent electron paths each having therealong an electron source, an electron-collecting electrode and a control electrode therebetween, a tuned circuit coupled between said two collecting electrodes, a coil magnetically coupled to said circuit, means connecting each terminal of said coil to one of said control electrodes, and a reversing switch in said connecting means for reversing the connection of said coil to said control electrodes.

SURRIUS RECTOR MONTCALM.

REFERENCES CITED

The following references are of record in the file of this patent:

UNITED STATES PATENTS

| Number | Name | Date |
|---|---|---|
| 1,966,616 | David | July 17, 1934 |
| 2,326,314 | Usselman | Aug. 10, 1943 |
| 2,425,297 | Atkins et al. | Aug. 12, 1947 |
| 2,462,903 | Romander | Mar. 1, 1949 |